No. 775,487. PATENTED NOV. 22, 1904.
F. J. AREND.
CENTRIFUGAL CREAMER.
APPLICATION FILED JUNE 23, 1903.
NO MODEL. 2 SHEETS—SHEET 1.
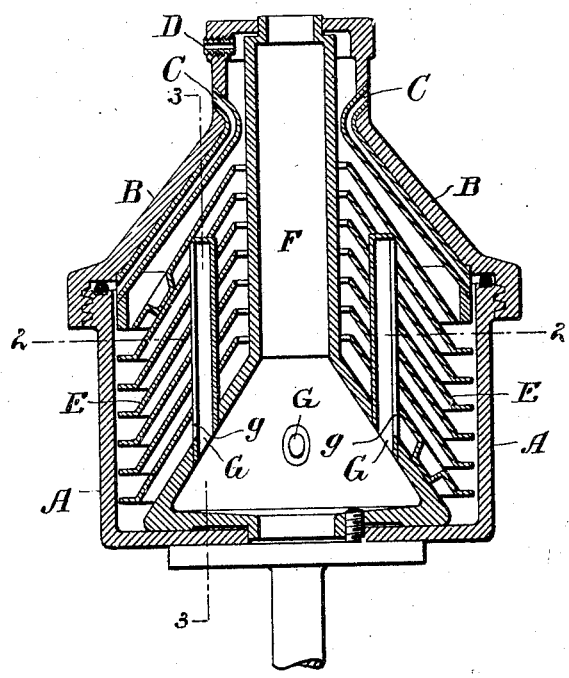
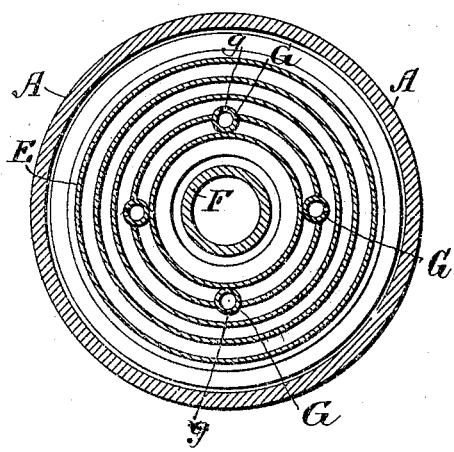
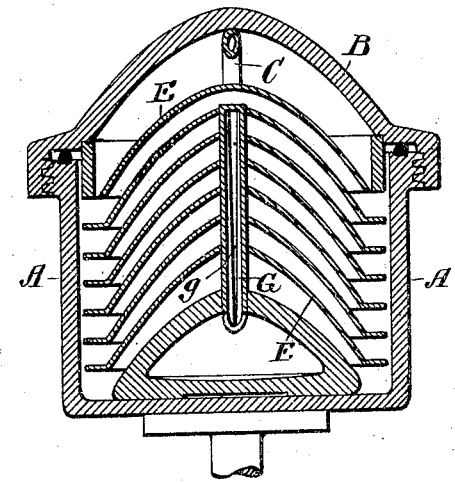
Witnesses:
Inventor:

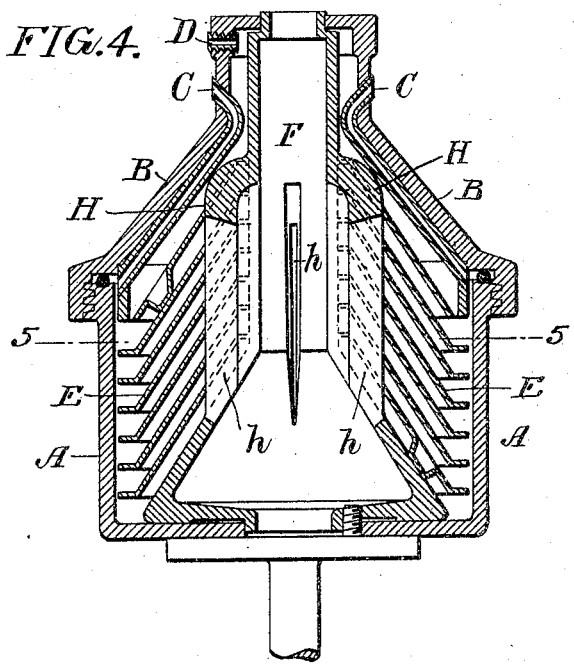
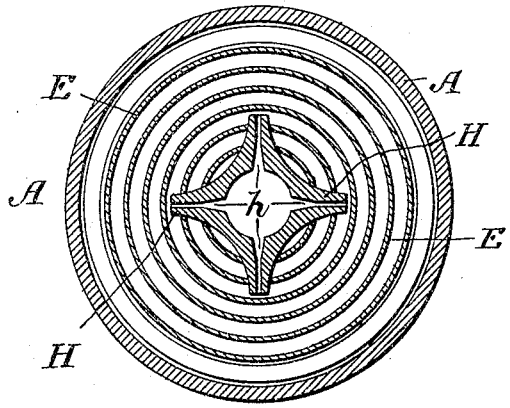
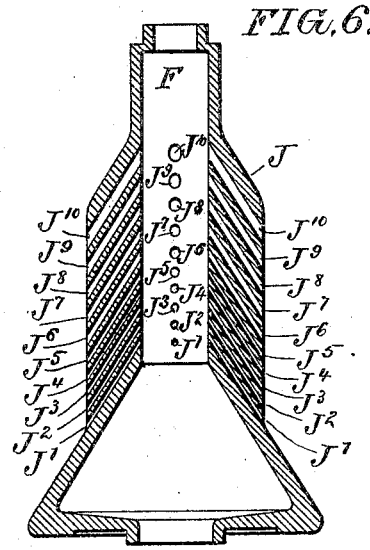

No. 775,487. Patented November 22, 1904.

UNITED STATES PATENT OFFICE.

FRANCIS J. AREND, OF NEW YORK, N. Y., ASSIGNOR TO THE DE LAVAL SEPARATOR COMPANY, A CORPORATION OF NEW JERSEY.

CENTRIFUGAL CREAMER.

SPECIFICATION forming part of Letters Patent No. 775,487, dated November 22, 1904.

Application filed June 23, 1903. Serial No. 162,714. (No model.)

*To all whom it may concern:*

Be it known that I, FRANCIS J. AREND, a citizen of the United States, residing at New York city, county of New York, and State of New York, have invented a new and useful Improvement in Centrifugal Creamers, of which the following is a full, clear, and exact description, reference being had to the accompanying drawings, which form a part of this specification.

My invention has for its object the improvement of that type of centrifugal creamers which are illustrated, described, and claimed in Letters Patent of the United States No. 640,358, issued January 2, 1900, to John Joseph Berrigan, assignor to Aktiebolaget Separator. In that patent there is shown in the bowl a liner or division contrivance consisting of a series of superposed conical division plates or disks, the said plates or disks extending from near the periphery of the bowl toward the axis thereof, an orificed inlet and distributing device extending vertically through and intersecting said plates and opening into the neutral zone of the creamer between adjacent plates of the division contrivance or liner, the purpose of such combination being that the full milk will be fed between the disks beyond the cream-wall and also by means of the distributing device will be fed in approximately like quantities to the space between each pair of disks or plates. Without doubt the principle and combination of this patent enable like quantities to be fed into the spaces between each pair of disks, and to a substantial, material, and beneficial extent it is so carried out in the specific embodiments of the invention or specific machines disclosed in that patent.

My invention has for its object certain improvements in details of construction which, while not departing from the principle or invention of that patent, have in practice given a more perfect distribution of the full milk into the spaces between the disks or plates. Speaking specifically, in the Patent No. 640,358 the distributing device is shown in one embodiment of the invention as a tube or tubes slotted from end to end. In another embodiment it is shown as a wing or wings slotted or slit from end to end. I have discovered that if with such machines instead of forming the slot in the tube or tubes, wing or wings of the same width from bottom to top I make the width of the slot of varying width, the least width being at the bottom and the greatest width at the top, the intermediate slot preferably gradually increasing in width, there will be more even distribution of the full milk in all the spaces between the disks. I can also accomplish this result by forming in place of the continuous slot a series of apertures or orifices, one opposite each of the openings between the disks.

I will now describe my invention as embodied in the accompanying drawings, in which—

Figure 1 is a vertical section through the bowl of a centrifugal separator embodying my invention. Fig. 2 is a cross-section on the line 2 2, Fig. 1. Fig. 3 is a sectional view on line 3 3, Fig. 1. Fig. 4 is a view similar to Fig. 1 of a modified form. Fig. 5 is a section on the line 5 5, Fig. 4. Fig. 6 is a section of a portion of the machine, showing a modified form of the orificed inlet and distributing-tube.

A is the bowl; B, the cover; C, the milk-outlet tube; D, the cream-outlet tube; E, the frusto-conical disks or plates; F, the central feed-tube. So far this is descriptive of all the drawings and the machine of Patent No. 640,358.

Speaking now of Figs. 1, 2, and 3, G are the distributing-tubes, having the slot $g$. As may be clearly seen, Fig. 3, this slot $g$ is of least width at the bottom and gradually increases in width to the top. In Figs. 4 and 5 I use wings H, similar to the wings of Patent No. 640,358. The slot or slit $h$ in these wings, as may be clearly seen in Fig. 4, is, however, made like the slot of Figs. 1, 2, and 3, with the least width at the bottom and with gradually-increasing width. In Fig. 6 the openings $J'$-$J^{10}$ in the wings J are formed of a plurality of orifices or openings, one in line with each of the spaces between the plates or disks, the opening $J'$ being the smallest and the opening $J^{10}$ the largest and the intermediate openings gradually increasing in size. This modification, as shown, is adapted to be used with a bowl having twelve disks, although of course the number of disks and holes is immaterial. Of course I do not intend to limit myself to the application of the orifices $J'$-$J^{10}$ to a wing alone, as they can be applied in place of a continuous slot in the tube construction of Figs. 1 to 3; nor do I intend to limit myself to the position as shown of the slot or openings in the tubes or wings nor to the number of wings or tubes as shown.

Having now fully described my invention, what I claim, and desire to protect by Letters Patent, is—

1. In a centrifugal creamer, the combination with a division contrivance, consisting of a series of superposed conical division-plates, the plates extending from near the periphery of the bowl and extending through the separating-space of the bowl, of an orificed inlet and distributing device extending vertically through and intersecting said plates, the orifice of said device at the bottom thereof being of lesser size than at the top of said device.

2. In a centrifugal creamer, the combination with a division contrivance, consisting of a series of superposed conical division-plates, the plates extending from near the periphery of the bowl and extending through the separating-space of the bowl, of an orificed inlet and distributing device extending vertically through and intersecting said plates, the orifice of said device at the bottom thereof being of lesser size at the bottom of the device, and gradually increasing in size between the bottom and the top of said device.

3. In a centrifugal creamer, the combination, with a division contrivance, consisting of a series of superposed conical division-plates, the plates extending from near the periphery of the bowl and extending through the separating-space of the bowl, of an inlet and distributing device provided with orifices in line with the space between each pair of plates, the orifices opening into the spaces between the lower pair of plates being less in size than those between the upper pairs of plates.

4. In a centrifugal creamer, the combination with a division contrivance consisting of a series of superposed conical division-plates, the plates extending from near the periphery of the bowl and extending through the separating-space of the bowl, of an inlet and distributing device provided with orifices in line with the space between each pair of plates, the size of the orifices gradually increasing from the lower end to the upper end of said device.

5. The combination with a centrifugal-separator drum and a liner therein of an inlet-pipe the openings of which are narrower at the lower end than at the upper end of the said inlet-pipe, substantially as and for the purpose set forth.

In testimony of which invention I have hereunto set my hand, at New York city, this 13th day of June, 1903.

FRANCIS J. AREND.

Witnesses:
JOHN S. PAUL,
GEO. R. REMINGTON.